United States Patent
Weigel

(10) Patent No.: US 11,130,155 B2
(45) Date of Patent: Sep. 28, 2021

(54) SORTING DEVICE FOR TABLETS

(71) Applicant: Harro Hoefliger Verpackungsmaschinen GmbH, Allmersbach im Tal (DE)

(72) Inventor: Marco Weigel, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 35 days.

(21) Appl. No.: 16/813,385

(22) Filed: Mar. 9, 2020

(65) Prior Publication Data

US 2020/0298277 A1     Sep. 24, 2020

(30) Foreign Application Priority Data

Mar. 21, 2019   (EP) .................................... 19164330

(51) Int. Cl.
*B07B 1/24* (2006.01)
*B65G 47/14* (2006.01)
*G07F 17/00* (2006.01)

(52) U.S. Cl.
CPC ............. *B07B 1/24* (2013.01); *B65G 47/14* (2013.01); *B65G 47/1485* (2013.01); *G07F 17/0092* (2013.01)

(58) Field of Classification Search
CPC .......................... B65G 47/14; B65G 47/1407; B65G 47/1485; B65G 47/1478; B65G 47/525; B65B 35/26; B65D 83/04; B65D 83/0409; G07F 17/0092; B07B 1/24; B07B 13/003; B07B 13/04; B07B 13/02
See application file for complete search history.

(56) References Cited

U.S. PATENT DOCUMENTS

| | | | | |
|---|---|---|---|---|
| 1,056,764 | A | * | 3/1913 | Naramor ................. B07B 13/04 209/617 |
| 3,871,295 | A | * | 3/1975 | Ackley .............. B65G 47/1485 101/40 |
| 4,231,462 | A | * | 11/1980 | Ackley, Sr. ........ B65G 47/1471 198/380 |

(Continued)

FOREIGN PATENT DOCUMENTS

| | | |
|---|---|---|
| DE | 2525258 A1 | 12/1976 |
| DE | 102006024072 A1 | 11/2007 |
| FR | 2548055 A1 | 1/1985 |

*Primary Examiner* — Patrick H Mackey
(74) *Attorney, Agent, or Firm* — Walter Ottesen, P.A.

(57) ABSTRACT

A sorting device for tablets for separating out multiple tablets has a plurality of stations including a feed station, a sorting station and an ejection station, and a tablet transporter which moves to the individual stations in a direction of rotation. The tablet transporter includes a row of tablet receivers for single tablets and a doublet receiver for multiple tablets which have been separated out. The doublet receiver is laterally next to the tablet receivers. An individual tablet receiver is laterally separated from the doublet receiver via a side wall. In the sorting station is a sorting tine which can be moved to and fro over a travel range in a lateral direction extending transversely to the direction of rotation such that the sorting tine passes over the region of a tablet receiver, the adjacent doublet receiver and the side wall located between them.

10 Claims, 2 Drawing Sheets

(56) References Cited

U.S. PATENT DOCUMENTS

| | | | | |
|---|---|---|---|---|
| 4,327,825 A * | 5/1982 | Ackley, Sr. | ........ | B65G 47/1471 |
| | | | | 198/380 |
| 4,377,971 A * | 3/1983 | Ackley | ................... | B41F 17/36 |
| | | | | 101/40 |
| 4,657,130 A * | 4/1987 | Ackley, Jr. | ......... | B65G 47/1471 |
| | | | | 198/333 |
| 5,232,079 A * | 8/1993 | Belcastro | ................. | A24C 5/34 |
| | | | | 198/370.11 |
| 2008/0099499 A1* | 5/2008 | Kim | .................... | G07F 17/0092 |
| | | | | 221/82 |
| 2014/0183208 A1* | 7/2014 | Bae | .................... | G07F 17/0092 |
| | | | | 221/91 |
| 2015/0090733 A1* | 4/2015 | Park | .................... | G07F 17/0092 |
| | | | | 221/1 |

* cited by examiner

SORTING DEVICE FOR TABLETS

CROSS REFERENCE TO RELATED APPLICATION

This application claims priority of European patent application no. 19 164 330.3, filed Mar. 21, 2019, the entire content of which is incorporated herein by reference.

FIELD OF THE INVENTION

The disclosure relates to a sorting device for tablets for separating out multiple tablets.

BACKGROUND OF THE INVENTION

In the production of tablets or microtablets, in particular with a coating, it can happen, for process-related reasons, that individual specimens adhere to one another. A frequently occurring form is the twin, with two tablets adhering together. However, triplets or larger agglomerates can also occur, which results in undesirable adverse effects in downstream processes.

It has been shown that larger agglomerates can be separated out by a screening process. However, it has also been recognized that this cannot be ensured with sufficient process reliability in the case of twins or triplets. Experiments with screening lines in different arrangements could not rule out the possibility that twins will reach a downstream filling process and thus lead to problems.

In some applications, it is important that only tablets or microtablets which are actually individualized are processed. For example, when filling microtablets into hard shell capsules, the dosing process can be based, within the scope of 100% control, on counting individual tablets. In this connection, it has been observed that the presence of twins cannot reliably be detected in the case of such counting using the known means. This leads to a fall in output and can also entail faults in the dosing unit.

SUMMARY OF THE INVENTION

It is an object of the invention to reliably avoid process disruptions due to multiple tablets.

This object can, for example, be achieved by a sorting device for tablets for separating out multiple tablets. The sorting device includes: a plurality of stations including a feed station, a sorting station and an ejection station; a tablet transporter configured to move to individual ones of the plurality of stations in a direction of rotation; the tablet transporter including a row of tablet receivers for single tablets and a doublet receiver for multiple tablets which have been separated out; the doublet receiver being positioned laterally adjacent to the row of tablet receivers; each of the tablet receivers of the row of tablet receivers having a side wall laterally separating the tablet receiver from the doublet receiver; an individual one of the tablet receivers, a corresponding one of the side walls, and the doublet receiver conjointly defining a sorting region; and, a sorting tine configured to be moveable to and fro over a travel path in a lateral direction extending transversely to the direction of rotation in such a manner that the sorting tine passes over the sorting region.

According to the disclosure there is provided a sorting device for tablets for separating out multiple tablets, wherein such multiple tablets may be twins, triplets or larger agglomerates of adhering tablets. Since in practice they are predominantly twins, such multiple tablets are also referred to hereinbelow as doublets for the sake of simplicity. The sorting device has a plurality of stations, wherein these stations include at least a feed station, a sorting station and an ejection station. The sorting device additionally has a tablet transporter which moves to the individual stations in a direction of rotation. The tablet transporter includes at least one row of tablet receivers for single tablets and at least one doublet receiver, positioned laterally next to the tablet receivers, for multiple tablets which have been separated out. An individual tablet receiver is laterally separated from the doublet receiver by means of a side wall. There is provided in the sorting station at least one sorting tine which can be moved to and fro over a travel range in a lateral direction extending transversely to the direction of rotation, in such a manner that the sorting tine thereby passes over the region of a tablet receiver, the adjacent doublet receiver and the side wall located between them.

A sorting device according to the disclosure makes use of the fact that single tablets are received completely by a tablet receiver, while multiple tablets, on account of their size, protrude outwards beyond the edge of the tablet receiver. In the desired normal case, in which a single tablet is located in the tablet receiver, the sorting tine passes without effect over the tablet. The single tablets remain in their tablet receiver until they are transferred at the ejection station from the tablet receiver to the downstream process, that is, for example, a dosing or counting process. If, however, a multiple tablet lands in such a tablet receiver, its protruding portion is hit by the sorting tine. As a result of the lateral movement of the sorting tine, the multiple tablet is tipped over the side wall of the tablet receiver and falls in a turning or tipping movement into the adjacent doublet receiver. Precise spatial separation of the doublets from the single tablets is thereby brought about in such a manner that their movement paths extend laterally offset next to one another. The result of this separation is that all the tablet receivers that are guided to the ejection station on a movement path either contain normal single tablets or are empty. In any case, they cannot contain any doublets. It is thus ensured that all the tablets ejected on that movement path are actually single tablets. The multiple tablets separated out previously by means of the sorting tine can easily be diverted and disposed of because they are transported on a separate movement path. Process disruptions due to multiple tablets are reliably avoided.

It can be sufficient for a doublet receiver to be arranged on only one side of the tablet receiver. Preferably, however, a doublet receiver is positioned on both sides of the tablet receiver, wherein the travel range of the sorting tine reaches from one doublet receiver to the adjacent doublet receiver and the tablet receiver located between them. In an advantageous further embodiment, a plurality of rows of tablet receivers and doublet receivers are arranged alternately next to one another in the lateral direction, wherein a sorting tine is provided for each row of tablet receivers. The sorting tine can thereby act in both movement directions, which contributes towards simple movement control and short cycle times.

The to and fro movement of the at least one sorting tine can take place randomly, or independently of other movements of the sorting device. Preferably, however, it is so synchronized with the rotating movement of the tablet receivers that each tablet receiver is passed over precisely once by a sorting tine at the location of the sorting station. The synchronized movement ensures that the ejection of doublets takes place at precisely one location under reproducible conditions, which assists with process reliability.

The sorting tine is advantageously elastically resilient. It is thus possible to position the sorting tine very close to the peripheral surface of the tablet transporter, which contributes towards reliable hitting of the doublets. The tipping movement of the doublet about the edge of the side wall does not result in a blockage, despite the small distance from the sorting tine, since the sorting tine is able to yield in an elastically resilient manner.

In a further embodiment, a pressure channel opens into the tablet receiver. A negative pressure source is thereby provided in the region of the feed station, which negative pressure source subjects the tablet receiver to a negative pressure via the pressure channel in order to suck in tablets. On the one hand, the tablets can be held securely in the tablet receivers along their transport path. On the other hand, the holding force of the negative pressure can readily be overcome when the doublets are being separated out, so that a reliable action of the sorting tines is ensured.

Advantageously, at least one compressed air nozzle is positioned in the region of the feed station and directed at the row of tablet receivers. In particular under the action of the above-described negative pressure, accumulations or agglomerates of a plurality of tablets can form at a tablet receiver dimensioned for single tablets during tablet feeding—regardless of the presence or absence of doublets. Such accumulations can reliably be broken up and blown away by the compressed air nozzle.

It can be sufficient that the single tablets fall out of their tablet receivers at the ejection station solely by their weight force. In an embodiment, however, an overpressure source is provided in the region of the ejection station. The overpressure source subjects the tablet receiver to an overpressure in order to blow out the tablets. Even with short cycle times, it is ensured that the individual tablets are ejected and thus transferred to the further process precisely in terms of time and location.

The tablet transporter can be in the form of a revolving conveyor chain, or conveyor belt, in the form of a rotary plate or the like. Preferably, it is a rotatable roller on the periphery of which the tablet receivers and the at least one doublet receiver are located. With a simple mechanical construction, short cycle times can be achieved.

The doublet receiver, like the tablet receiver, can be a separate pocket or the like. Preferably, it is in the form of a peripheral groove. The groove facilitates the discharge of the doublets which have been separated out. In addition, no particular requirements in terms of precision are made of the process of tipping the doublets out of the respective tablet receivers. It is sufficient if the doublet which has been tipped out lands anywhere in the groove.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
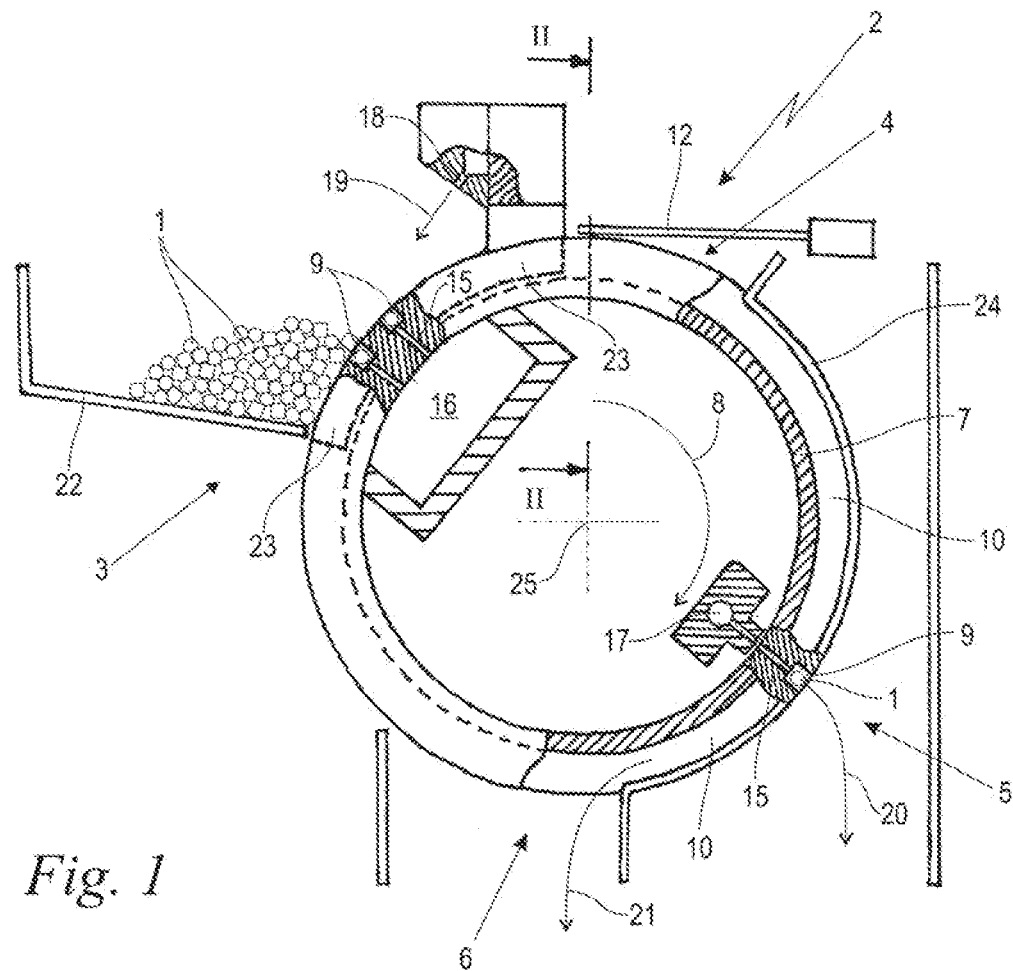
FIG. 1 is a schematic, partially cutaway side view of a sorting device configured according to the disclosure having tablet receivers, having a feed station, and having sorting tines in the region of a sorting station for separating out multiple tablets.

FIG. 1 is a schematic, partially cutaway side view of a sorting device 2 configured according to the disclosure. The sorting device 2 includes a plurality of stations, of which there are mentioned here at least a feed station 3, a sorting station 4, and an ejection station 5. In the feed station 3, tablets 1 are fed to the sorting device 2. A tablet transporter 7 of the sorting device 2 moves to the individual stations in a revolving manner in a direction of rotation 8 and thereby conveys the fed tablets 1 from the feed station 3 via the sorting station 4 to the ejection station 5. Any doublets or multiple tablets 1' present (FIGS. 2, 3, 4) are separated out in the manner described in greater detail hereinbelow, so that only single tablets 1 are ejected at the ejection station 5 and fed to the downstream process, specifically counting and dosing.

A sorting device 2 and the associated sorting method are here shown in connection with tablets 1 in the form of coated microtablets, which are counted within the scope of a later 100% control and filled in a predetermined number into hard shell capsules. The invention can, however, be used with any other form of tablets 1 and also for other purposes, provided that the separating out of undesirable multiple tablets 1' is required.

In the embodiment shown, the tablet transporter 7 is a roller which, in operation, is driven in rotation about a horizontal axis of rotation 25. However, there may also come into consideration as the tablet transporter 7 a rotary plate, a conveyor belt or the like. In the peripheral surface of the roller there are formed at least one, here a plurality of rows of tablet receivers 9 for single tablets 1 which extend in the direction of rotation and are offset axially relative to one another. The tablet receivers 9 are in the form of individual pockets which are separate from one another and which are open radially outwards. A pressure channel 15 optionally opens into the radially inner base of each tablet receiver 9.

At the feed station 3 there is a tablet feeder 22 in which the tablets 1 to be sorted, in the form of loose bulk material, lie on a sloping base and slide towards the outer peripheral surface of the tablet transporter 7. The sliding movement of the tablets 1 can be assisted by a vibrating movement of the tablet feeder 22. The base of the tablet feeder 22 can be in the form of a screen, through which undesirable constituents such as loose powder or tablet fragments can be screened out. The single tablets 1 finally land in the individual tablet receivers 9. Each individual tablet receiver 9 is so adapted in shape and size to the tablets 1 to be sorted that there is space in precisely one tablet receiver 9 for precisely one tablet 1.

In the region of the feed station 3 there is arranged a negative pressure source 16. The tablet receivers 9 are connected in the feed station 3 via their pressure channel 15 to the negative pressure source 16, whereby their interior is subjected to negative pressure. The negative pressure has the effect of sucking the single tablets 1 into the tablet receivers 9 and initially holding them securely therein. In the region of the feed station 3 there is additionally at least one compressed air nozzle 18, which is directed at an associated row of tablet receivers 9. In the embodiment shown, this is a nozzle bar which is arranged axially parallel and covers all the rows of tablet receivers 9 and by means of which compressed air is directed at the tablet receivers 9 according to an arrow 19. If the above-described sucking in of the tablets 1 leads to larger tablet accumulations, these are blown away and land back in the tablet feeder, wherein during normal operation as desired, only a single tablet 1 remains in each tablet receiver 9.

The single tablets 1 held in their tablet receivers 9 are transported in the direction of rotation 8 past the sorting station 4, which will be described hereinbelow, to the ejection station 5. In the region thereof there is an overpressure source 17. For the process of ejection, the tablet receivers 9 in the ejection station 5 are connected via their pressure channel 15 to the overpressure source 17, whereby their interior is subjected to overpressure. The overpressure has the effect that the single tablets 1 are blown out according to an arrow 20 and fall through an indicated channel for further processing (counting, dosing).

Figure 2:
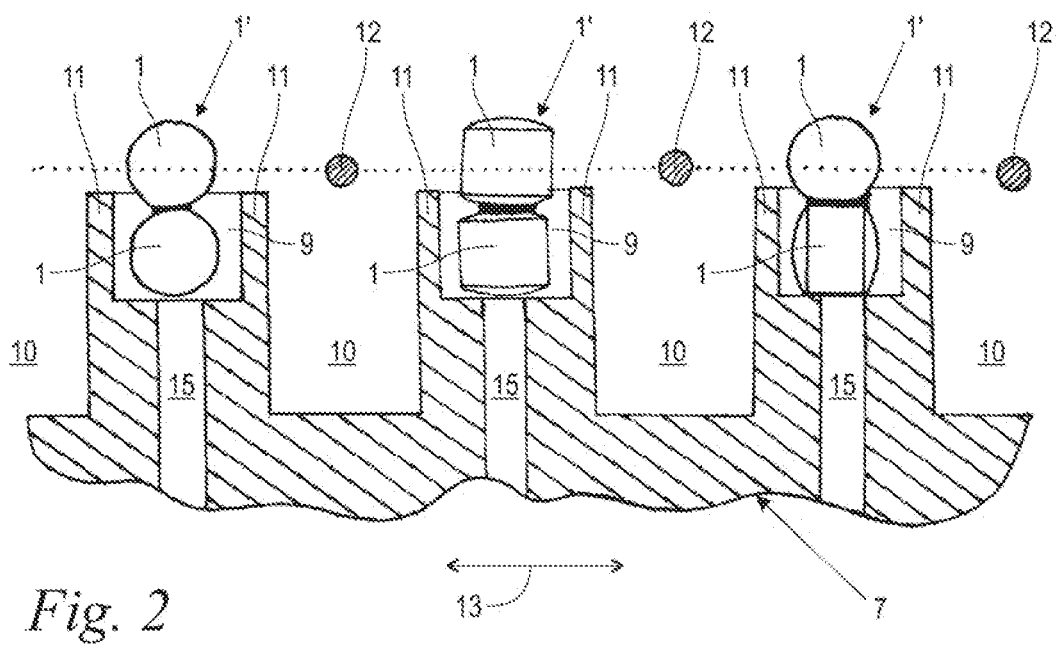
FIG. 2 is an enlarged sectional view of a detail of the sorting device according to FIG. 1 having multiple tablets, sorting tines and doublet receivers.

FIG. 2 is an enlarged sectional representation of a detail of the sorting device according to FIG. 1 in the region of the sorting station 4, along the cutting line marked II-II in FIG. 1. In a lateral direction 13 extending axis-parallel to the axis of rotation 25 (FIG. 1), a plurality of rows of tablet receivers 9 are located next to one another. In addition, it will be apparent from studying FIGS. 1 and 2 together that at least one doublet receiver 10 is positioned in the tablet transporter 7 laterally next to the peripheral row of tablet receivers 9 in the lateral direction 13. In the embodiment shown, a plurality of rows of tablet receivers 9 and doublet receivers 10 are arranged alternately next to one another in the lateral direction 13. The individual tablet receivers 9 are separated laterally from the adjacent doublet receivers 10 on both sides by means of a side wall 11.

The doublet receivers 10, like the tablet receivers 9, can be individual pockets, but here they are in the form of peripheral, radially outwardly open grooves and are positioned offset axially relative to the rows of tablet receivers 9. In the region of the feed station 3 there is, for each of the grooves, a stationary filling member 23 (FIG. 1). The filling members 23 close the grooves or the doublet receivers 10 from the feed station 3 until the start of the sorting station 4, so that the fed tablets 1 land only in the tablet receivers 9 but not, prematurely, in the doublet receivers 10.

From the sorting station 4 according to the cross-sectional representation according to FIG. 2, and from there continuing in the direction of rotation 8, the cross-section of the doublet receivers 10 in groove form is, however, free to receive multiple tablets 1'. Such multiple tablets 1' are shown by way of example in FIG. 2, according to which single tablets 1, for example as a result of a coating process, adhere to one another in different configurations and may pass into the tablet receivers 9. Using the example of double tablets or doublets, three such possible configurations are shown here. However, triple tablets or the like can also occur. For the sake of simplicity, however, the term "doublet" is here used as a synonym for any desired form of a multiple tablet 1', in which a plurality of single tablets 1 adhere to one another. In any case, such a multiple tablet 1' protrudes radially outwards beyond the edge of the tablet receiver 9, since the tablet receiver is configured in terms of its shape and size to receive only a single tablet 1.

For separating out such multiple tablets 1' protruding from the tablet receiver 9, there is provided in the sorting station 4 at least one sorting tine 12, the function of which will be described hereinbelow. From studying FIGS. 1 and 2 together, it will also be apparent that, in the embodiment shown, a sorting tine 12 is provided for each peripheral row of tablet receivers 9, wherein the individual sorting tines 12 are held on a common carrier for joint movement comparable to a rake.

Figure 3:
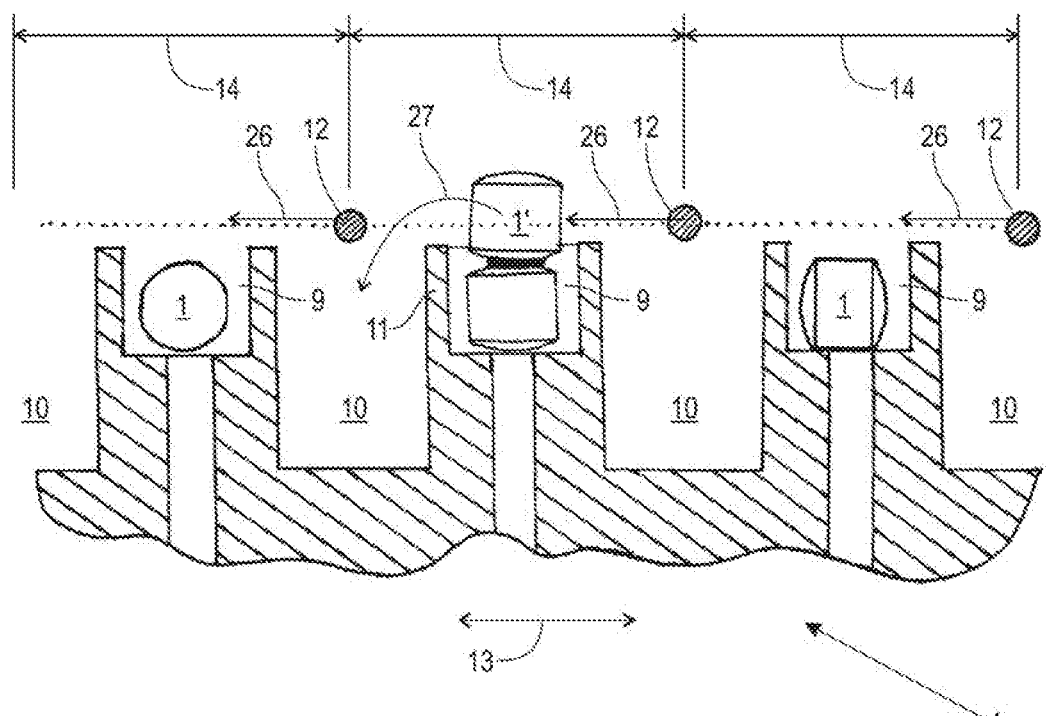
FIG. 3 shows the arrangement according to FIG. 2 with a multiple tablet in conjunction with a sorting tine moved in a lateral direction; and, FIG. 4 shows the arrangement according to FIGS. 2 and 3 with a further multiple tablet and with the sorting tines during a backwards movement.

The function of the sorting device will now become apparent having regard to FIG. 3. FIG. 3 shows the arrangement according to FIG. 2 under realistic conditions: a single multiple tablet 1' is located in a single tablet receiver 9, while the remaining tablet receivers 9 contain normal single tablets 1. For separating out the undesired multiple tablet 1', the at least one sorting tine 12, here the totality of the sorting tines 12, can be moved to and fro over a travel range 14 in the lateral direction 13 extending transversely to the direction of rotation 8, in such a manner that the sorting tine 12 passes over at least the region of a tablet receiver 9, the adjacent doublet receiver 10 and the side wall 11 located between them. In the embodiment shown, the lateral movement of the sorting tines 12 according to FIG. 3 first takes place to the left. This lateral movement according to an arrow 26 in the first, here the left, direction begins at a position approximately centrally above a doublet receiver 10 and ends, after passing over the tablet receiver 9, again approximately centrally over the opposite doublet receiver 10. The individual sorting tines 12 thereby come to rest in the starting position of the adjacent sorting tine 12.

The normal single tablets 1 remain unaffected by the above-described movement of the sorting tines 12 and remain in their tablet receivers 9. However, the sorting tine 12 that passes over the tablet receiver 9 with the multiple tablet 1' collides with the protruding portion of the multiple tablet 1' and pushes the multiple tablet sideways towards the opposite side wall 11. As the sideways movement continues, the multiple tablet 1' is turned or tipped over the edge of the side wall 11 out of its tablet receiver 9 according to an arrow 27 and lands in the adjacent doublet receiver 10. The sorting tines 12 are elastically resilient and are able to yield in particular in the vertical direction, that is, radially relative to the axis of rotation 25 (FIG. 1), so that, during the mentioned tipping movement, the multiple tablet 1', the side wall 11 and the sorting tine 12 do not become jammed.

Figure 4:
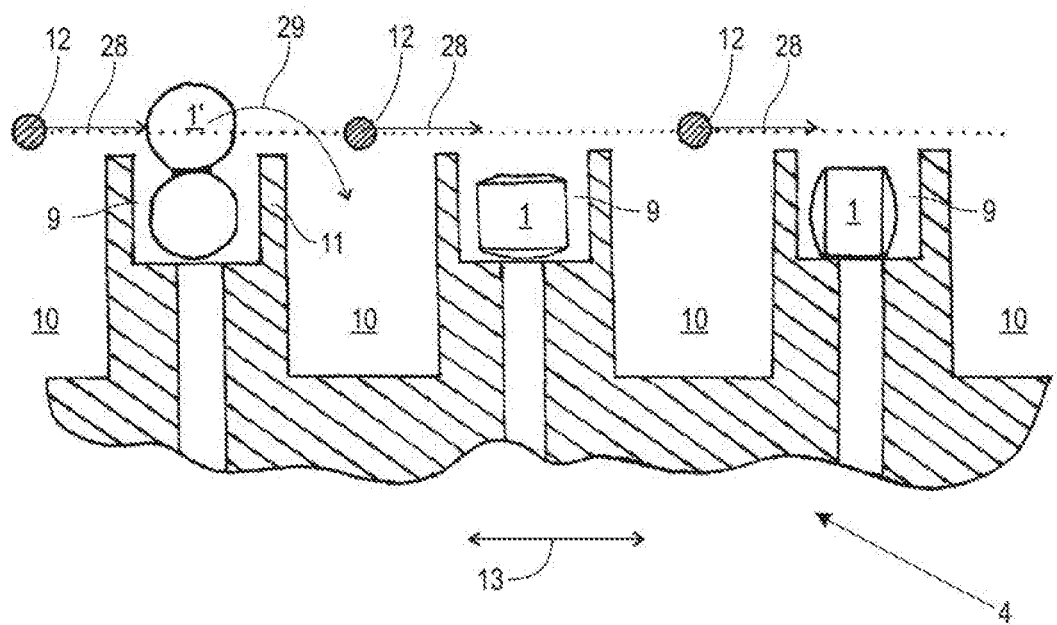

It can be sufficient always to carry out the above-described separating out in only one movement direction of the sorting tines. However, it will become apparent from studying FIGS. 3 and 4 together that the movement of the sorting tines 12 in both directions, that is, on traveling to and fro, is preferably used for the separating out. FIG. 4 shows the arrangement according to FIG. 3 after completion of the above-described separating out and during the introduction of a further, different multiple tablet 1'. This time, the movement of the sorting tines 12 takes place in the opposite direction, that is, from left to right.

Otherwise, however, the procedure is as before: The protruding multiple tablet 1' is hit by the sorting tines 12 introduced sideways according to an arrow 28 and turned over the edge of the opposite side wall 11 into the opposite doublet receiver 10 according to an arrow 29.

Alternating between FIGS. 3 and 4, a to and fro movement of the sorting tines 12 takes place. In the embodiment provided here, the to and fro movement of the sorting tines 12 is so synchronized with the rotating movement of the tablet receivers 9 (FIG. 1) that, as each tablet receiver 9 is brought to the sorting station 4, a movement cycle according to FIG. 3 or according to FIG. 4 is carried out. All the tablet receivers 9 immediately following one another are thus passed over precisely once by a sorting tine 12 at the location of the sorting station 4.

Referring again to FIG. 1, it will be apparent that the doublets turned out of their tablet receivers 9 are able to slide downwards in the direction of rotation 8 through the doublet receivers 10 in groove form and fall out of a doublet outlet 6 in the lower region of the sorting device 2, spatially separate from the normal single tablets ejected at the ejection station 5, according to an arrow 21 and can be disposed of. At the ejection station 5, however, only single tablets 1 are located in the tablet receivers 9, so that the tablets 1 ejected here are free of adverse effects due to multiple tablets 1'.

It is understood that the foregoing description is that of the preferred embodiments of the invention and that various changes and modifications may be made thereto without departing from the spirit and scope of the invention as defined in the appended claims.

What is claimed is:

1. A sorting device for tablets for separating out multiple tablets, the sorting device comprising:
    a plurality of stations including a feed station, a sorting station and an ejection station;
    a tablet transporter configured to move to individual ones of said plurality of stations in a direction of rotation;
    said tablet transporter including a row of tablet receivers for single tablets and a doublet receiver for multiple tablets which have been separated out;
    said doublet receiver being positioned laterally adjacent to said row of tablet receivers;
    each of said tablet receivers of said row of tablet receivers having a side wall laterally separating said tablet receiver from said doublet receiver;
    an individual one of said tablet receivers, a corresponding one of said side walls, and said doublet receiver conjointly defining a sorting region; and,
    a sorting tine configured to be moveable to and fro over a travel path in a lateral direction extending transversely to the direction of rotation in such a manner that said sorting tine passes over said sorting region.

2. The sorting device of claim 1, wherein said doublet receiver is a first doublet receiver; each of said tablet receivers has a first side and a second side; said first doublet receiver is disposed on said first side of each of said tablet receivers; the sorting device further comprising:
    a second doublet receiver disposed on said second side of each of said tablet receivers; and,
    said travel path of said sorting tine extends from said first doublet receiver to said second doublet receiver, wherein a corresponding one of said tablet receivers is located between said first doublet receiver and said second doublet receiver.

3. The sorting device of claim 1, wherein:
    the sorting device includes a plurality of rows of tablet receivers and a plurality of doublet receivers;
    said tablet receivers and said doublet receivers are arranged alternately next to one another in the lateral direction;
    the sorting device includes a plurality of sorting tines; and,
    each of said plurality of rows of tablet receivers are provided with one of said plurality of sorting tines.

4. The sorting device of claim 1, wherein the to and fro movement of said sorting tine is synchronized with a rotational movement of said tablet receivers such that each of said tablet receivers is passed over precisely once by said sorting tine at said sorting station.

5. The sorting device of claim 1, wherein said sorting tine is elastically resilient.

6. The sorting device of claim 1 further comprising:
    a plurality of pressure channels each opening into an associated one of said tablet receivers; and,
    a negative pressure source disposed in the region of said feed station and configured to subject said tablet receivers to an under pressure via corresponding ones of said pressure channels in order to draw in tablets.

7. The sorting device of claim 1 further comprising at least one compressed air nozzle disposed in a region of the feed station and directed at said row of tablet receivers.

8. The sorting device of claim 1 further comprising:
    a plurality of pressure channels each opening into an associated one of said tablet receivers; and,
    an overpressure source disposed in a region of said ejection station and configured to subject said tablet receivers to an overpressure via a corresponding one of said plurality of pressure channels in order to blow out the tablets.

9. The sorting device of claim 1, wherein said tablet transporter is a rotatable roller defining a periphery; and, said tablet receivers and said doublet receiver are disposed on said periphery of said rotatable roller.

10. The sorting device of claim 1, wherein said doublet receiver is a peripheral groove.

\* \* \* \* \*